(12) United States Patent
Gailloux et al.

(10) Patent No.: US 8,301,180 B1
(45) Date of Patent: Oct. 30, 2012

(54) SYSTEM AND METHODS FOR ROBUST MESSAGING

(75) Inventors: Michael A. Gailloux, Overland Park, KS (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 232 days.

(21) Appl. No.: 12/781,614

(22) Filed: May 17, 2010

(51) Int. Cl.
*H04W 4/00* (2009.01)

(52) U.S. Cl. .................. 455/466; 455/412.1; 455/412.2; 708/530; 708/533; 714/48; 714/49; 714/50

(58) Field of Classification Search ......................... None
See application file for complete search history.

(56) References Cited

U.S. PATENT DOCUMENTS

| | | | |
|---|---|---|---|
| 6,023,620 A * | 2/2000 | Hansson | 455/419 |
| 6,618,747 B1 | 9/2003 | Flynn et al. | |
| 7,010,360 B2 * | 3/2006 | Atkin et al. | 700/16 |
| 7,116,997 B2 | 10/2006 | Byers et al. | |
| 2003/0103483 A1 * | 6/2003 | Joshi et al. | 370/338 |
| 2004/0066935 A1 * | 4/2004 | Marino | 380/270 |
| 2004/0268206 A1 * | 12/2004 | Kim et al. | 714/758 |
| 2007/0281766 A1 * | 12/2007 | Mullen | 463/7 |
| 2008/0010349 A1 * | 1/2008 | Cai et al. | 709/206 |
| 2008/0096538 A1 * | 4/2008 | Kim et al. | 455/418 |

* cited by examiner

*Primary Examiner* — Rafael Pérez-Gutiérrez
*Assistant Examiner* — Suhail Khan

(57) ABSTRACT

A portable electronic device is provided. The portable device comprises a wireless transceiver to receive and transmit messages and a messaging client. The messaging client receives a first message from the wireless transceiver, wherein the first message is from a first peer messaging client, parses the first message to read a first message sequence count, compares the first message sequence count to a first expected message sequence count, and based on a miscompare of the first message sequence count with the first expected message sequence count transmits a corrective message to the wireless transceiver for transmitting to the first peer messaging client.

17 Claims, 6 Drawing Sheets

SYSTEM AND METHODS FOR ROBUST MESSAGING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices provide nearly ubiquitous communication connectivity. A large proportion of the population of the United States and of populations of other developed nations own and carry with them one or more mobile communication devices. Mobile communication devices began by providing only voice communication capability. Later mobile communication devices, however, have added additional communications capabilities that may include short message service (SMS), multi-media messaging service (MMS), electronic mail (email), instant messaging (IM), World Wide Web browsing, and other communication capabilities.

SUMMARY

In an embodiment, a portable electronic device is disclosed. The portable device comprises a wireless transceiver to receive and transmit messages and a messaging client. The messaging client receives a first message from the wireless transceiver, wherein the first message is from a first peer messaging client, parses the first message to read a first message sequence count, compares the first message sequence count to a first expected message sequence count, and based on a miscompare of the first message sequence count with the first expected message sequence count transmits a corrective message to the wireless transceiver for transmitting to the first peer messaging client.

In an embodiment, a portable electronic device is disclosed. The portable electronic device comprises a wireless transceiver to receive and transmit messages and a messaging client. The messaging client determines a cyclic redundancy check (CRC) number based on an input content, composes a message comprising the input content, the cyclic redundancy check number, and a current time and transmits the message to the wireless transceiver to transmit to a first peer messaging client.

In an embodiment, a method of communicating is disclosed. The method comprises receiving, by a portable electronic device, a first message containing a first sequence count value and comparing, by the portable electronic device, the first sequence count value to a first expected count value associated with communication between the portable electronic device and a first peer electronic device. The method further comprises determining, by the portable electronic device, based on the comparison of the first sequence count value to the first expected count value, that the portable electronic device has failed to receive an at least one message from the first peer electronic device. The method further comprises transmitting, by the portable electronic device, a second message to the first peer electronic device requesting that the first peer electronic device retransmit the at least one message that the portable electronic device failed to receive.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
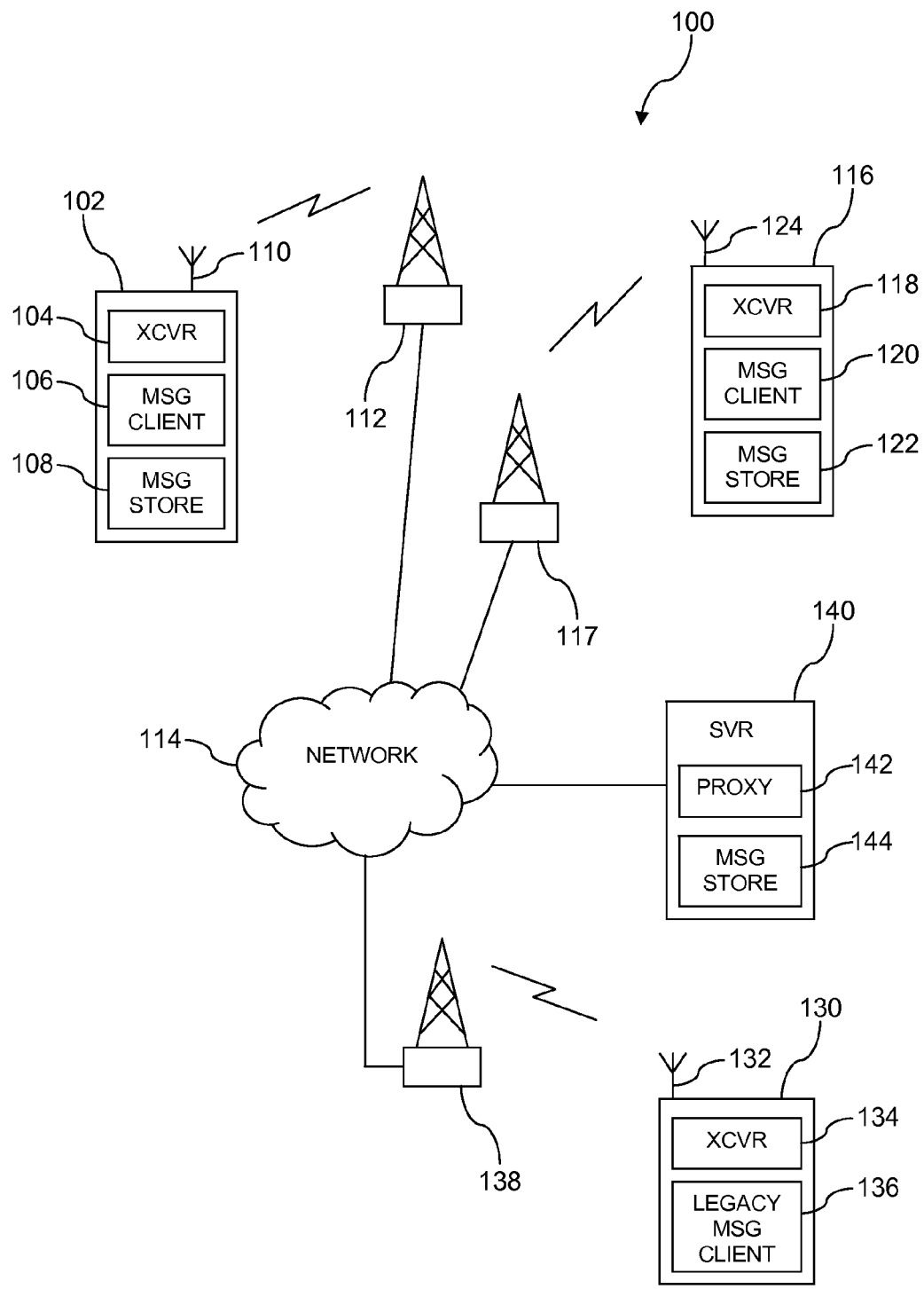
FIG. 1 is an illustration of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several innovations for providing enhanced reliability to mobile messaging are disclosed herein. A variety of mobile messaging problems have been experienced by users of portable electronic devices, including lost messages, duplicated messages, corrupted message content, and other problems. Sometimes a network may indicate to a sender that a message has been delivered when in fact the message, for one reason or another, is not received by the destination communication device. While in the following enhancements of the short message service (SMS), also referred to as text messages, may be described, it is understood that some or all of the described techniques for enhancing short messaging service communication may be applicable to other message services, for example multi-media messaging service (MMS), instant messaging (IM), electronic mail (email), and others.

A single sequence count of messages sent from a first portable electronic device to a second portable electronic device and from the second portable electronic device to the first portable electronic device may be maintained by a messaging client application executing on both the first and second portable electronic devices. The messages exchanged by the first portable electronic device and the second portable electronic device may be referred to as a conversation or a thread, for example a first message thread. Messages exchanged between the first portable electronic device and a third portable electronic device may be referred to as another conversation or thread, for example a second message thread. As used herein, a message thread means all messages exchanged between two particular devices, and such a message thread may comprise messages having content associated with widely divergent subjects and/or topics. Thus, as used herein, the term message thread is distinct from a use of the term "thread" in other contexts wherein messages may be identified as belonging to a thread by being associated with a common subject, topic, or theme.

When a message in the first message thread is lost, the sequence count of messages may be used by one of the messaging clients to determine that the message has been lost and for the messaging client to take corrective action. For example, the messaging client may send a message resend request to the corresponding portable electronic device or resend messages to the corresponding portable electronic device, depending on which device failed to receive the lost messages. The current sequence count is sent in each message between the first and second portable electronic devices. The sequence count may be presented on a display of the first and second portable electronic device so the user of the portable electronic device may be able to know whether a message has been lost in the subject message thread. In an embodiment, two separate sequence counts may be maintained: a first sequence count for messages sent from the first portable electronic device to the second portable electronic device and a second sequence count for messages sent from the second portable electronic device to the first portable electronic device.

The sequence count may be used to order the presentation of messages that have been received out of order. The sequence count may be used to provide a message receipt confirmation function. For example, the first portable electronic device sends a message containing a current sequence count to the second portable electronic device. The first portable electronic device thereafter sends a special message to the second portable electronic device requesting confirmation of the prior message that is designated by the subject sequence count. The messaging client of the second portable electronic device may respond to the confirmation request without presenting any associated message on the display of the second portable electronic device. For example, the second portable electronic device may send a receipt message containing the current sequence count as maintained by the second portable electronic device and without any content back to the first portable electronic device. If the sequence count matches the sequence count maintained by the first portable electronic device, receipt by the second portable electronic device of the message is confirmed; if the sequence count does not match the sequence count maintained by the first portable electronic device, receipt by the second portable electronic device is not confirmed and some follow-up action may be needed on the part of the first portable electronic device. Alternatively, receipt confirmation may be implemented by including a receipt confirmation request flag in the message from the first portable electronic device. The second portable electronic device may respond to the set receipt confirmation request flag by sending a receipt message containing the current sequence count maintained by the second portable electronic device and without any message content to the first portable electronic device.

A timestamp may be added to the message sent from the first portable electronic device to the second portable electronic device and/or from the second portable electronic device to the first portable electronic device. The timestamp may be used along with a message receipt time to determine a network message transit time. The network message transit time may vary with network loading. The network message transit time may vary with a time of day, a day of the week, and other circumstances. A current average network message transit time may be used in a variety of manners. The current average network message transit time may be presented on a display of the first and/or second portable electronic devices so a user may be able to adjust their expectations of a message reply response time. The current average network message transit time may be used in collaboration with the message sequence count described above to defer requesting a resend of a message until after ample time has been allowed for a missing message to transit the network, for example two standard deviations of the average network message transit time. The average network message transit time may be determined generally across all message threads and/or may be determined on a per-message thread basis.

A cyclic redundancy check (CRC), hash code, numerical digest, or other integrity check code may be generated based on the content of the message and transmitted with the message to promote integrity checking of the message by the message receiver. If the integrity check at the receiving portable electronic device fails, the subject portable electronic device may request a resend of the subject message. Messages are typically stored in a memory of the portable electronic device. A message lifespan may be designated for different message conversations or message threads, and stored messages that are older than the designated lifespan may be deleted from the memory.

A messaging client of the first portable electronic device may be configured to send a check-up type of message to the second portable electronic device if a defined period of time has passed without the first portable electronic device sending a message to and/or receiving a message from the second portable electronic device, for example if a day has passed or if a week has passed without receiving a message from the second portable electronic device. The user of the first portable electronic device could configure a standard message to be sent in this circumstance such as "Haven't heard from you lately. Everything OK?" This functionality may be useful to children of an aged parent living alone, parents of a child away at college, or other circumstances. Alternatively, this functionality could present an alert on the first portable electronic device prompting the user of the first portable electronic device to contact the user of the second portable electronic device, for example by sending a message or by placing a telephone call to the second portable electronic device.

Turning now to FIG. 1, a system 100 is described. The system 100 comprises a first portable electronic device 102, a first base transceiver station (BTS) 112, a second base transceiver station 117, a network 114, and a second portable electronic device 116. The first base transceiver station 112 provides a wireless communication link to the first device 102 and couples the first device 102 to the network 114. Likewise the second base transceiver station 117 provides a wireless communication link to the second device 116 and couples the second device 116 to the network 114. In an embodiment, the system 100 may also comprise a third base transceiver station 138, a third portable electronic device 130, and a server 140. While three portable electronic devices 102, 116, 130 and three base transceiver stations 112, 117, 138, and one server 140 are illustrated in FIG. 1, it is understood that the system 100 may comprise any number of devices 102, 116, 130, base transceiver stations 112, 117, 138, and server 140. While the first device 102, the second device 116, and the third device 130 are illustrated as being served by different base transceiver stations 112, 117, 138, when two of the devices 102, 116, 130 both happen to be in the coverage area of the same base transceiver station 112, 117, 138, it is understood that a single base transceiver station 112, 117, 138 may provide wireless links to both the two devices 102, 116, 130. Additionally, while the devices 102, 116, and 130 are all illustrated as coupled to the network 114 via wireless links, it is understood that some of the messaging enhancements described below may provide for messaging communication between the devices 102, 116 and a communication device coupled to the network without any wireless communication links, for example a computer and/or a desktop phone.

The wireless links provided by the base transceiver stations 112, 117, 138 may be provided according to any mobile communication protocol including a code division multiple access (CDMA) based technology, a global system for mobile communication (GSM) based technology, a long-term evolution (LTE) based technology, a worldwide interoperability for microwave access (WiMAX) technology, and other mobile communication technologies. In some cases, the first base transceiver station 112 may operate in accordance with a first mobile communication protocol, and the second base transceiver station 117 may operate in accordance with a different mobile communication protocol, for example when the second portable electronic device 116 receives wireless communication services from a different service provider and/or through a different mobile communication network. Likewise, the third base transceiver station 138 may operate in accordance with yet a different mobile communication protocol than either of the base transceiver stations 112, 117 or may operate in accordance with the same mobile communication protocol as one of the base transceiver stations 112, 117. Any of the base transceiver stations 112, 117, 138 may be a femtocell.

The network 114 may comprise any combination of public and private networks. The network 114 may carry both voice traffic and data traffic, which may be referred to in some contexts as bearer traffic. The network 114 may also carry signaling traffic such as various control signals and/or command signals. The network 114 may comprise network equipment operated by a plurality of different communication service providers. Communication carried from the first portable electronic device 102 to the second portable electronic device 116 and passing through the network 114 may be carried by a variety of network equipment operated by two or more different communication service providers. Network equipment, as known to those of ordinary skill in the art, may comprise switches, routers, gateways, functional servers, and other communication equipment.

The portable electronic devices 102, 116, 130 may be any of a mobile phone, a personal digital assistant (PDA), a media player, and a gaming device. A mobile phone is discussed in more detail hereinafter. The first device 102 comprises a first radio transceiver 104, a first messaging client 106, a first message store 108, and a first antenna 110. The first radio transceiver 104 in association with the first antenna 110 promote the first device 102 communicating via the wireless link with the first base transceiver station 112 by transmitting and receiving messages and transmitting and receiving voice traffic.

The first messaging client 106 provides a messaging functionality to the first device 102, for example a short message service (SMS) functionality, including the ability to create a message, to designate an intended recipient of the message, to send the message through the first radio transceiver 104 and the first antenna 110, to receive a message from another device through the first radio transceiver 104 and the first antenna 110, and to present the received message to a user of the first device 102, for example by displaying the message as text on a visual display or by converting a text of the message to a voice signal and playing the voice signal over a speaker of the first device 102. The first messaging client 106 may store both outgoing messages and received messages in the first message store 108. The first messaging client 106 may add additional information to the stored messages, such as a message receipt time.

The second device 116, likewise, comprises a second radio transceiver 118, a second messaging client 120, a second message store 122, and a second antenna 124 that provide functionality like those of the corresponding components of the first device 102. The third device 130 comprises a third antenna 132, a third radio transceiver 134, and a legacy messaging client 136. The legacy messaging client 136 provides legacy messaging that does not support the innovative messaging functionality of the present disclosure. In an embodiment, the server 140 may provide some of the support for the new messaging functionality described herein on behalf of the legacy messaging client 136. The server 140 may be implemented as a computer system. Computer systems are described further hereinafter.

The first messaging client 106 exchanges messages, for example short message service (SMS) messages or text messages, with other messaging clients on peer portable electronic devices, for example with the second messaging client 120. Messages exchanged between the first messaging client 106 and the second messaging client 120 are associated with a first message conversation and/or a first message thread. Messages exchanged between the first messaging client 106 and other messaging clients, likewise, are associated with a second message conversation and/or second message thread, a third message conversation and/or third message thread, a fourth message conversation and/or fourth message thread, and so forth.

Figure 2:
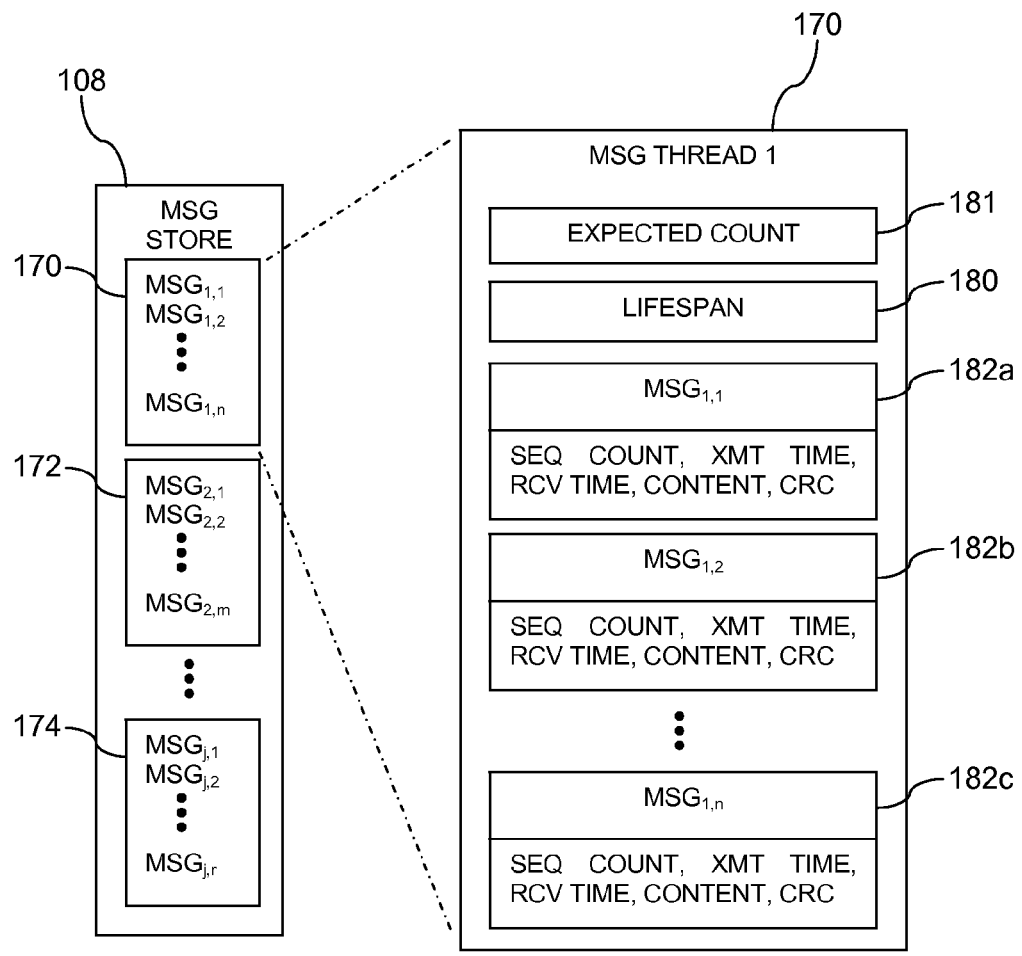
FIG. 2 is an illustration of a message store according to an embodiment of the disclosure.

Turning now to FIG. 2, the first message store 108 is described further. The first message store 108 may be organized to store messages associated with the first message conversation 170, to store messages associated with a second message conversation 172, and to store messages associated with a third message conversation 174. Each of the message conversations 170, 172, 174 may comprise any number of messages. Additionally, the first message store 108 may comprise any number of different message conversations. While the messages associated with the message conversations are illustrated in FIG. 2 as stored separated based on message conversation, in an embodiment the messages may be mixed together and may be distinguished by message conversation identifiers contained within each message.

The first messaging client 106 and the corresponding messaging client may maintain a sequence count of the messages that they exchange. In one embodiment, a single sequence count is maintained and is aggregated for each message exchanged in a message thread. In this embodiment, the first messaging client 106 may maintain a first sequence count and the second messaging client 120 may maintain a second sequence count. When the sequence counts are synchronized, the first and second sequence counts should agree with each other, whereby this may be referred to as a single sequence count implementation or embodiment. In an alternative embodiment, different sequence counts are maintained for messages transmitted from the first messaging client 106 to the second messaging client 120 and for messages transmitted from the second messaging client 120 to the first messaging client 106. In this embodiment, the first messaging client 106 may maintain a first sequence count for messages that it transmits to the second messaging client 120 and a second sequence count for messages that it receives from the second messaging client 120; and the second messaging client 120 may maintain a third sequence count for messages that it receives from the first messaging client 106 and a fourth sequence count for messages that it transmits to the first messaging client 106. When the sequence counts are synchronized, the first and third sequence counts should agree with each other, and the second and fourth sequence counts should agree with each other, whereby this may be referred to as double sequence count implementation or embodiment. The single sequence count embodiment is described first and the double sequence count embodiment is described further below. While the sequence count functionality is described based on messages exchanged between the first and second messaging clients 106, 120, it is understood that the same functionality may be employed by message threads between the first messaging client 106 and other messaging clients.

The first messaging client 106 and the second messaging client 120 maintain an on-going count of messages exchanged between them. The first messaging client 106 may maintain its understanding of the sequence count in an expected count 181 in the first message conversation 170 of the first message store 108. Alternatively, the first messaging client 106 may parse the list of messages on the subject message thread to determine the appropriate sequence count. The first messaging client 106, for example, may send the first message in the message thread between the first and second messaging clients 106, 120. The first messaging client 106 includes a sequence count having the value 1 in the message transmitted to the second messaging client 120. The sequence count may be placed at a predefined position at the start of the message, at the end of the message, or at some other position within the message. When the second messaging client 120 sends a reply, it includes a sequence count having the value 2 in the message transmitted to the first messaging client 106. If the first messaging client 106 sends another message to the second messaging client 120 before the second messaging client 120 sends a reply, the first messaging client 106 sends the message including a sequence count having the value of 2. At any given time, both the first messaging client 106 and the second messaging client 120 must agree on the current value of the sequence count associated with their message thread. In another embodiment, however, the messaging clients 106, 120 may count in different increments and search for an unexpected jump or increment of the sequence count that would indicated a missing message.

The first message store 108 stores both the messages sent by the first messaging client 106 to the second messaging client 120 and the messages received by the first messaging client 106 from the second messaging client 120. The stored messages may comprise a first stored message 182a, a second stored message 182b, and a third stored message 182c. The stored messages 182 may comprise a sequence count, a transmit time, a receive time, the message content, and an optional cyclic redundancy check or other integrity check code. Some of the information may have been sent in the stored message, for example the transmit time and/or the integrity check code while other of the information may be added by the first messaging client 106, for example the receive time. Some of the information may not be provided or may have a null value, for example a receive time for a message that is transmitted by the first messaging client 106. Stored messages 182 transmitted by the first messaging client 106 may be discriminated from stored messages 182 received by the first messaging client 106 by an additional transmit/receive flag that is contained by the stored messages 182 but not shown in FIG. 2. Alternatively, an empty, a null, or an invalid receive field may be used to infer the directional sense of the stored messages 182: a null receive field may imply that the first messaging client 106 transmitted the subject message while a valid receive field may imply that the second messaging client 120 transmitted the subject message. The structure and function of the second message store 122 may be substantially similar to the structure and function of the first message store 108 described above and below.

When one or more messages in the message thread between the first and second messaging clients 106, 120 is sent but not received, the sequence counts maintained by messaging clients 106, 120 will disagree or miscompare. After the sequence counts maintained by the messaging clients 106, 120 begin to disagree, a condition which may be referred to as unsynchronized sequence counts and the sequence counts may be said to be out of synchronization, a message including the sequence count sent by one and received by the other messaging client 106, 120 will permit determination by the receiving messaging client 106, 120 that the sequence counts are unsynchronized, that a message has been lost, and determination that corrective communication is needed to restore the one or more lost messages and to resynchronize the sequence counts.

A variety of different corrective communications are contemplated by the present disclosure. In the description that follows, it is assumed that the first messaging client 106 has determined that the sequence counts are unsynchronized. One corrective procedure is for the first messaging client 106 to one of resend a plurality of the messages it has most recently transmitted to the second messaging client 120, in the case that the sequence count maintained at the first messaging client 106 is greater than the sequence count received in a message from the second messaging client 120, or to request the second messaging client 120 to retransmit a plurality of messages that the second messaging client 120 has recently sent, in the case that the sequence count maintained by the first messaging client 106 is less than the sequence count received in a message from the second messaging client 120. One skilled in the art will readily appreciate that the sequence count comparison may be performed after the first messaging client 106 has incremented the sequence count maintained by the first messaging client 106 in response to receiving the message from the second messaging client 120.

The number of messages that are resent or requested to be resent may be determined based on the magnitude of miscompare between sequence counts. For example, if the sequence count maintained by the first messaging client 106 after incrementing in response to receiving a message from the second messaging client 120 is 4 less than the sequence count included in the received message, the first messaging client 106 may infer that four messages from the second messaging client 120 have been lost and request that the four messages that preceded the present message that was received be sent by the second messaging client 120 to be resent. Likewise, if the sequence count maintained by the first messaging client 106 after incrementing in response to receiving a message from the second messaging client 120 is 4 greater than the sequence count included in the received message, the first messaging client 106 may infer that the four last messages sent by the first messaging client 106 to the second messaging client 120 have been lost and may retransmit these last four messages to the second messaging client 120.

In an embodiment, after a corrective procedure has been undertaken and completed, a confirmation message may be exchanged between the messaging clients 106, 120 to assure that the desired correction has been successfully completed. For example, after the first messaging client 106 has requested messages to be resent and has received the requested messages, the first messaging client 106 may send a confirmation message to the second messaging client 120 indicating that the sequence counts are now synchronized, for example by sending the current sequence count maintained by the first messaging client 106.

Other corrective procedures may also be employed to restore sequence count synchronization. For example, the first messaging client 106 may analyze the transmitted and received messages associated with the first message conversation 170 stored in the first message store 108 and transmit a log of at least some of the received and/or transmitted messages to the second messaging client 120. The log may comprise information about one or more of sequence counts, directional sense of messages, timestamp of messages sent, timestamp of messages received, without including the full content of the messages. The second messaging client 120, in response to receiving the log of the received and transmitted messages, may compare this log to the transmitted and received messages associated with the subject message thread stored in the second message store 122 to determine what messages were transmitted by the first messaging client 106 that were not received by the second messaging client 120 and to determine what messages were transmitted by the second messaging client 120 that were not received by the first messaging client 106. The second messaging client 120 may then retransmit some messages stored in the second message store 122 to the first messaging client 106 and may request that the first messaging client 106 retransmit some messages stored in the first message store 108. In some cases, when one or more missing messages are restored during a resynchronization procedure, message sequence numbers may be assigned and/or reassigned to these messages to maintain the expected relationships. In some cases a plurality of message sequence count numbers may be reassigned to some messages. In other cases, one or more message sequence count numbers may be assigned factional values to intercalate them into a sequence of integer message sequence count numbers and retain the expected order relationships.

It is possible that the first messaging client 106 and the second messaging client 120 may send messages using the same next message sequence count number at substantially the same time, a circumstance that may be referred to as a race condition. Because each client 106, 120 knows that it has recently sent a message having the same message sequence count number as the message it is receiving, the detection of this race condition when neither of the messages or only one of the messages is lost is readily achieved and readily corrected between the two clients 106, 120. For example, the clients 106, 120 may exchange messages acknowledging the race condition collision, negotiate a solution for amending the message sequence count, and proceed to execute the solution. In the event that both messages are lost, an event that can be expected to rarely occur, the error may be detected when the next message is successfully sent between the clients 106, 120, when the receiving client will determine that the sending client did not receive the message previously sent, and correction will be negotiated.

In an embodiment, the first messaging client 106 may present a message to the user of the first portable electronic device 102 to notify them that a large number of messages are going to be requested to be resent to the first messaging client 106 and may only initiate the requested resend if the user approves this action. The resending of a relatively large number of messages to the first messaging client 106 may have billing implications for the service account of the user. Additionally, the resending of a relatively large number of messages to the first messaging client 106 may temporarily degrade the communications service of the first portable electronic device 102. The first messaging client 106 may notify the user for resends exceeding a threshold of 10 messages, a threshold of 20 messages, or a threshold of 30 messages. Additionally, the first messaging client 106 may decline to request resending a large number of missing messages, for example more than 50 messages, more than 75 messages, more than 100 messages, or more than some other threshold of numbers of messages.

The inclusion of the sequence count in the messages sent by the messaging clients 106, 120 may be used by the messaging clients 106, 120 to identify duplicate messages and to prevent the presentation of duplicate messages to the user of the devices 102, 116. For example, if the first messaging client 106 receives a message from the second messaging client 120 that has the same sequence count of a message 182 already stored in the first message store 108, the first messaging client 106 may infer that this message is a duplicate message and choose not to present it. Additionally, the first messaging client 106 may corroborate this inference by comparing the transmit timestamp, if present, in the message with the transmit timestamp in the message 182 stored in the first message store 108.

To promote prompt identification of an unsynchronized condition, in an embodiment, the messaging clients 106, 120 may send a message containing only the current message count occasionally, based on a signal event, or on a predefined periodic interval. Because this kind of message may include no actual content other than the sequence count and/or other communications infrastructure metrics such as a transmission timestamp, the corresponding messaging client 106, 120 may not present the subject message to a user of the device 102, 116. This kind of message that is not presented to a user of the device 102, 116 may be referred to in some contexts as a silent message or an invisible message. This kind of non-bearer messaging may present a burden to the network 114 and may not be implemented by some communication service providers or may be supported selectively when the network 114 has ample messaging bandwidth available.

In an embodiment, double sequence counts are used to track and monitor the messages of a message conversation and/or message thread. For example, the first messaging client 106 may maintain a first sequence count of messages sent by the first messaging client 106 to the second messaging client 120 and a second sequence count of messages received by the first messaging client 106 from the second messaging client 120. Likewise, the second messaging client 120 may maintain a third sequence count of messages received by the second messaging client 120 from the first messaging client 106 and a fourth sequence count of messages transmitted by the second messaging client 120 to the first messaging client 106. When the sequence counts are properly synchronized, the first sequence count should be equal to the third sequence count and the second sequence count should be equal to the fourth sequence count. In an embodiment, the first messaging client 106 includes only the first sequence count in a message it transmits to the second messaging client 120, and the second messaging client 120 includes only the fourth sequence count in a message it transmits to the first messaging client 106. Alternatively, the first messaging client 106 includes both the first sequence count and the second sequence count in a message that it transmits to the second messaging client 120, and the second messaging client 120 includes both the third sequence count and the fourth sequence count in a message that it transmits to the first messaging client 106.

An implementation of a double sequence count for transmitted messages and for received messages may have some advantages versus a single sequence count implementation, although both the double sequence count and the single sequence count provide common advantages over the known art. When using a single sequence count, errors can arise when both the first messaging client 106 and the second messaging client 120 transmit messages at substantially the same time, in which case both messages are liable to be associated by the sending messaging clients 106, 120 with the same sequence count, which is an error. Using different sequence counts for transmitted versus received messages obviates this race condition type of error. Additionally, sending both counts in each message promotes the possibility of more prompt detection and correction of lost messages. On the other hand, transmitting two counts in each message may decrease the amount of content that may be transmitted in a message. Additionally, processing two sequence counts may increase the processing burden on the messaging clients 106, 120. One skilled in the art will choose between the implementation alternatives of a single sequence count solution and a double sequence count solution according to the particular needs, operational goals, and circumstances of their communication network. It is understood in the following description that either a single sequence count solution or a double sequence count solution may be deployed and may promote delivering the further functionality described below.

When the first messaging client 106 exchanges messages with the legacy messaging client 136, the legacy messaging client 136 does not support the sequence count functionality described above. In an embodiment, the server 140 may intercept messages exchanged by the first messaging client 106 and the legacy messaging client 136, and a proxy application 142 executing on the server 140 may provide some of the sequence count functionality described above. To support this sequence count functionality, the server 140 may comprise a third message store 144 that may be similar in function and structure to that of the first message store 108 and/or the second message store 122. The proxy application 142 can identify when a message sent to the first messaging client 106 has not been received by the first messaging client 106, based on a miscompare with the sequence count, and retransmit the subject message or messages from the third message store 144. Likewise, the proxy application 142 can identify when a message sent by the first messaging client 106 has not been received by the proxy application 142, based on a miscompare with the sequence count, and request retransmission of the subject message or messages from the first messaging client 106. Additionally, the first messaging client 106 may detect these errors based on miscompared sequence count and either resend one or more messages or request one or more messages.

On the other hand, the proxy application 142 may not be able to detect or correct messages that are lost between the server 140 and the legacy messaging client 136. The proxy application 142 may strip out the sequence count information and/or other information from the messages before forwarding them on to the legacy messaging client 136 that might otherwise be confused by this additional information that it does not expect or may present the unexpected information to a user of the third portable electronic device, thereby possibly confusing and/or irritating the user.

A message receive confirmation function may be supported by the messaging clients 106, 120. For example, a message may be transmitted by the first messaging client 106 designated with a message receive confirmation request flag. Such a message receive confirmation request flag may be implemented by a single bit and may be one of several message communication mode configuration flags contained in a nibble (4 bits) or a byte (8 bits) transmitted with the message. Rather than sending a message containing a receive confirmation request flag, which adds overhead to messages and reduces the amount of content that messages may contain, the first messaging client 106 may send a special message received confirmation request message that designates the subject transmitted message for which receipt confirmation is requested, for example using the sequence count or other identification. When the second messaging client 120 receives the message having the message receive confirmation request flag active or the special message received confirmation request message, the second messaging client 120 may send a silent message to the first messaging client 106 containing the sequence count which may be interpreted by the first messaging client 106 as a receipt confirmation if the sequence count agrees with the sequence count maintained by the first messaging client 106. Alternatively, the second messaging client 120 may return a specialized confirmation message that identifies in another way that the subject message transmitted by the first messaging client 106 has been received by the second messaging client 120. If the first messaging client 106 does not receive a timely message received confirmation, the first messaging client 106 may infer that the message was not received. The first messaging client 106 may use an average network transit time of messages, to be discussed below, to determine when a message received confirmation is not arriving timely. For example, the first messaging client 106 may designate a time threshold that is two standard deviations of time greater than an average network transit time for messages for inferring that the message was not received by the second messaging client 120. Alternatively, if the first messaging client 106 receives a silent reply message having a sequence count that disagrees with the expected count 181 stored by the first message store 108, the first messaging client 106 may infer that the message was not received. It is understood that the message receive confirmation functionality would work in a corresponding fashion for like messages transmitted by second messaging client 120 to the first messaging client 106.

The messaging client 106, 120 may include a transmission time stamp with transmitted messages. The transmission time stamp may be a full time stamp encoding time and day, for example encoding time in seconds from some known time reference point such as Jan. 1, 1970. The transmission time stamp may identify time in some other format. Alternatively, the transmission time stamp may attempt to conserve bits committed to the time stamp by providing an incomplete encoding of time and day. For example, the time stamp may indicate a day in the range 0 to 7 that would consume 3 bits and an indication of time in the range 0 to 8191 that would consume 13 bits that could indicate a time of day with a precision of about ±6 seconds. This kind of incomplete time stamp may be adequate under some circumstances for determining the time of message transmission within acceptable limits of accuracy. Yet other time stamp embodiments suggest themselves to those skilled in the art.

The transmission time stamp that is contained in a received message may be used by the messaging client 106, 120 to determine a network transit time of the message. The messaging client 106, 120 may determine an average network transit time for messages in general as well as an average network transit time for messages associated with a particular message conversation and use these average network transit times for a variety of purposes. The average may be determined as a windowed average—an average calculated over a predefined number of previously received messages or an average calculated over a predefined length of time. The average network transit time for messages may be presented to a user of the device 102, 116 and may help to reduce calls to customer assistance centers when the user appreciates that the network temporarily may be operating more slowly. The average network transit time may be used as described above in setting a threshold for when to deem a message receipt confirmation has timed out. Additionally, the average network transit time may be used for delaying to allow reasonable time for any out of order messages to be received before undertaking corrective procedures.

In an embodiment, the messaging client 106, 120 may provide a facility for designating a lifespan for retention of messages in the first message storage 108. The lifespan may be designated for all messages or a different lifespan may be designated for each different message conversation and/or message thread. For example, a user may designate that messages on a message thread 170, 172, 174 associated with a spouse are to be retained for 72 hours while messages on a message thread 170, 172, 174 associated with a client are to be retained for 45 days. A lifespan 180 may be designated and stored with the first message conversation 170. When a message stored in the first message store 108 is older than its designated lifespan, the message may be deleted from the first message store 108 during the next execution of a clean-up routine that may be scheduled to occur periodically or aperiodically as a message's lifespan expires. The age of a message may be determined relative to a receipt time or to a transmit time of the subject messages. Alternatively, the first messaging client 106 may permit the user to define a maximum number of messages to retain in the first message store 108 and/or to define a maximum number of messages to retain on each message conversation 170, 172, 174. Messages may be deleted from the message conversations 170, 172, 174 on a first received, first deleted basis.

In an embodiment, the messaging client 106, 120 may provide a facility for exchanging a message with a messaging client with a minimum frequency, for example sending and/or receive a message to/from a parent living alone at least daily. For example, a user of the first messaging client 106 may designate that a message should be sent or received from a messaging client associated with an individual at least daily. If no message has been sent or received on the message conversation with the subject individual within 24 hours, the first messaging client 106 may send an automatically generated message to the messaging client of a portable electronic device associated with the subject individual. The first messaging client 106 may promote the user of the first device 102 configuring a default check-up message that is sent automatically. Alternatively, the first messaging client 106 may present an alert on the first portable electronic device 102, such as an aural alert or as a text message presented on a display of the device 102, admonishing the user to contact the subject individual, for example by sending a message via the first messaging client 106 or by another means such as telephoning. In an embodiment, the messaging client 106, 120 may either send the message to the subject messaging client or notify the user of the messaging client 106, 120 if no message has been received from the subject messaging client within the predefined period of time.

In an embodiment, the first messaging client 106 may generate a cyclic redundancy check (CRC), a hash code, or other digest based on the message to be transmitted and include this number in the message to be sent, for example at an end of the message, at the start of the message, or at a position within the message. The second messaging client 120 may calculate the same cyclic redundancy check, hash code, or other digest based on the content of the received message and compare this number with the integrity check number embedded in the first message by the first messaging client 106 to determine, to a predetermined level of expectation, whether the received content agrees with what was sent. It is contemplated that the cyclic redundancy check, hash code, or digest may be relatively short, for example 4 bits or 8 bits, to conserve messaging resources for carrying content. It is known by those skilled in the art that the level of expectation of accurate transmission of a message accompanied by a check number such as a cyclic redundancy check is based on the length or the number of bits dedicated to the check number.

Figure 3:
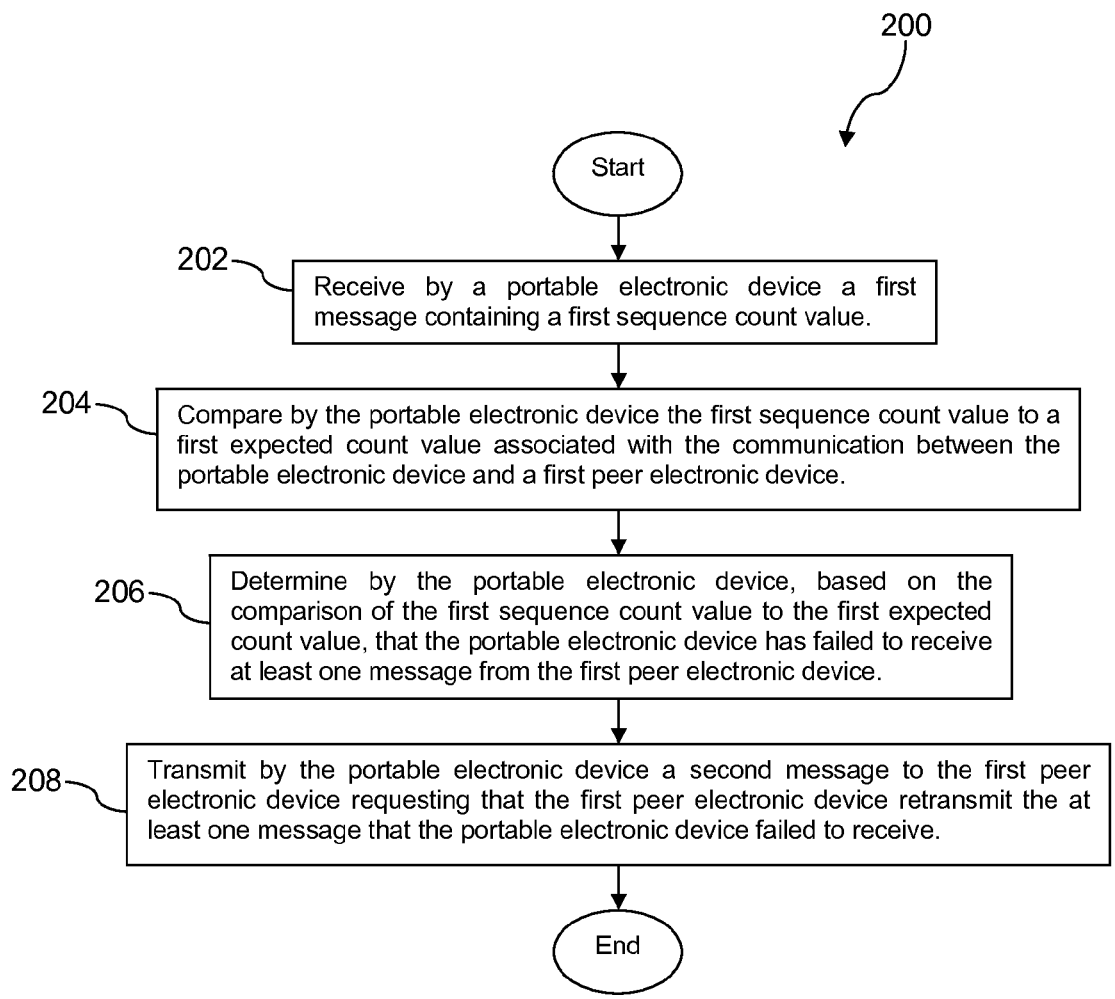
FIG. 3 is a flow chart of a method according to an embodiment of the disclosure.

Turning now to FIG. 3, a method 200 is described. At block 202, a first message containing a first sequence count value is received by a portable electronic device, for example the first messaging client 106 receives the first message. At block 204, the first sequence count value is compared to a first expected count value associated with the communication between the portable electronic device and a first peer electronic device. For example, the first messaging client 106 compares the first sequence count value received in the first message to the expected count value 181 described above with reference to FIG. 2.

At block 206, the portable electronic device determines, based on the comparison of the first sequence count value to the expected count value 181 (i.e., these values miscompare and are not the same as they would be expected to be), that the portable electronic device has failed to receive at least one message from the first peer electronic device. A component or routine of the first messaging client 106 may perform the comparison and determine when a miscompare occurs. At block 208, the portable electronic device transmits a second message to the first peer electronic device requesting that the first peer electronic device retransmit the at least one message that the portable electronic device failed to receive.

In a different circumstance, at block 206, the portable electronic device, based on the comparison, may determine that instead it is the first peer electronic device that has failed to receive at least one message, for example based on the first sequence count value contained in the message received from the first peer electronic device being less than the value stored in the first expected count value. In this circumstance, the portable electronic device may instead transmit the one or more messages that the first peer electronic device failed to receive. If need be, message sequence numbers may be revised and/or a sequence number may be assigned as a fractional number to intercalate the subject message in the sequence of message sequence numbers.

In an embodiment, the processing of block 204 may be delayed a predetermined period of time after receiving the first message to allow any out of order messages to be received. When the messages exchanged between the portable electronic device and the first peer device include transmit timestamps, the predetermined period of time may be based on an average network message transit time determined by the portable electronic device based on the transmit timestamps and based on receipt times.

In an embodiment, the method 200 may further comprise performing an integrity check of the contents of the first message and comparing the results of the check to an integrity code included in the first message, for example a cyclic redundancy check value, a hash code value, a digest value, or other value. If the integrity check indicates that the contents of the first message has been corrupted during transmission to the first messaging client 106, the first messaging client 106 may request that the first message be resent by the peer electronic device. In an embodiment, the first message may be a simple messaging system (SMS) message, a multi-media messaging system (MMS) message, an instant message (IM), an electronic mail (email), or other message.

Figure 4:
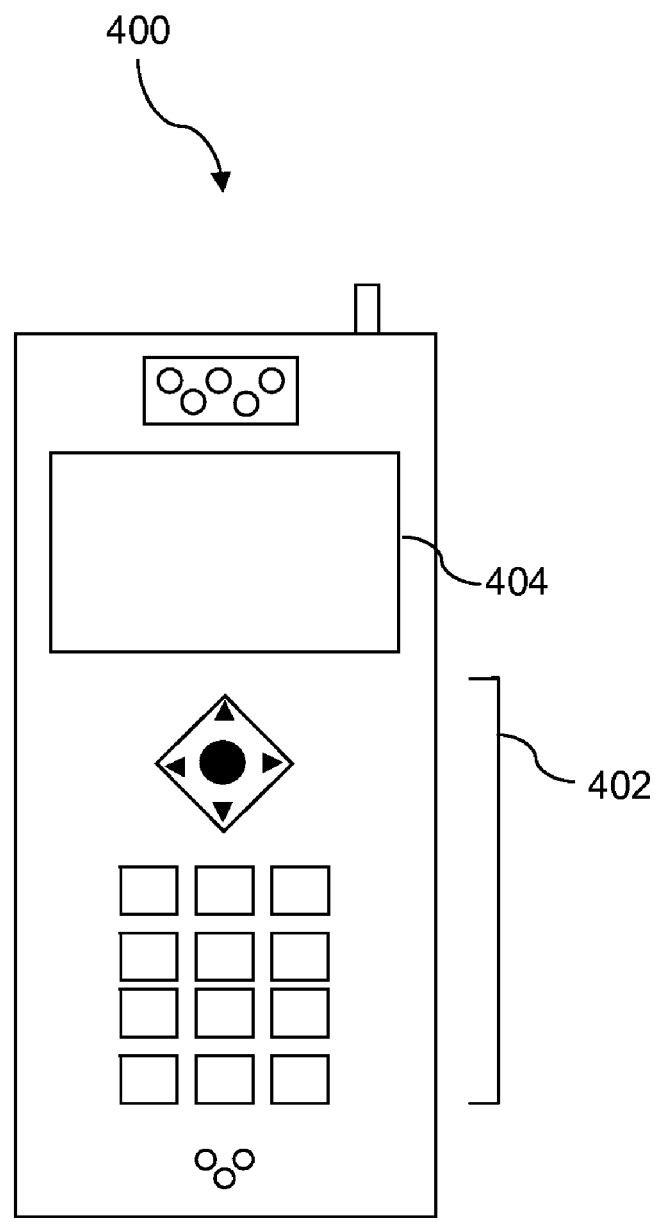
FIG. 4 is an illustration of a handset according to an embodiment of the disclosure.

FIG. 4 illustrates a mobile phone and/or handset 400, which is operable for implementing aspects of the present disclosure, but the present disclosure should not be limited to these implementations. Though illustrated as a mobile phone, the handset 400 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the handset 400 is not a general purpose computing device like a portable, laptop or tablet computer, but rather is a special-purpose communications device such as a mobile phone, wireless handset, pager, or PDA. The handset 400 may support specialized activities such as gaming, inventory control, job control, and/or task management functions, and so on.

The handset 400 includes a display 404 and a touch-sensitive surface and/or keys 402 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example from a wireless base station, a wireless access point, or a peer handset 400.

Figure 5:
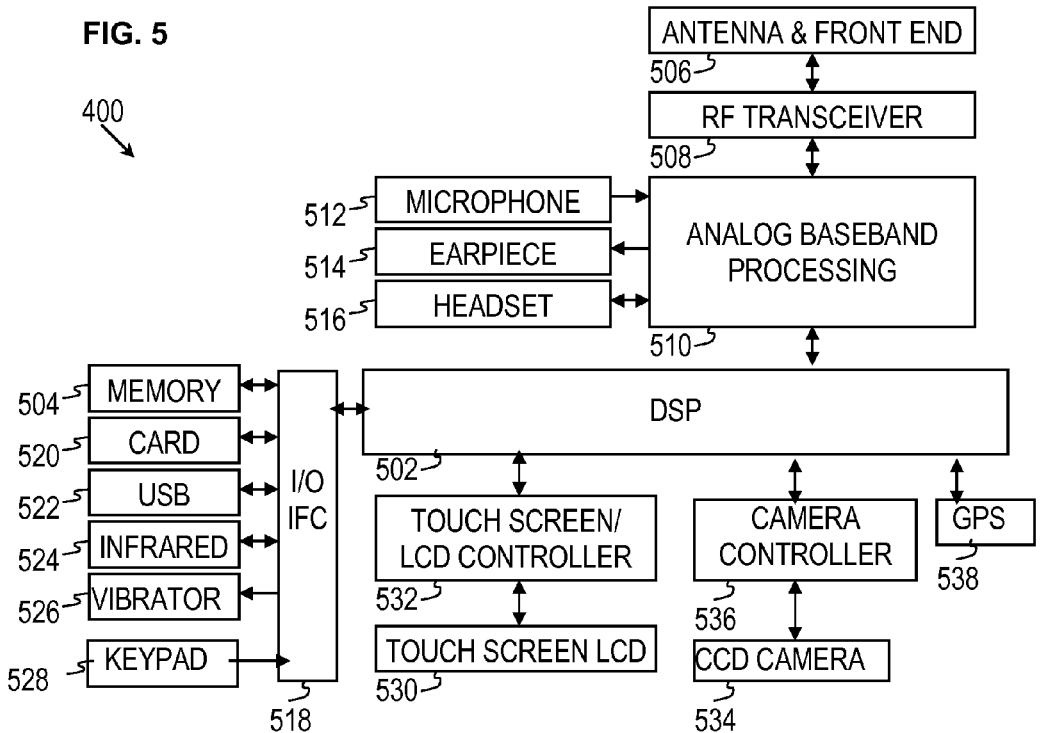
FIG. 5 is a block diagram of a handset according to an embodiment of the disclosure.

FIG. 5 shows a block diagram of the handset 400. While a variety of known components of handsets 400 are depicted, in an embodiment a subset of the listed components and/or additional components not listed may be included in the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a radio access network (RAN) or some other available wireless communications network or from a peer handset 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the handset 400 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the vibrator 526 that, when triggered, causes the handset 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. In another embodiment, a camera operating according to a technology other than charge coupled device cameras may be employed. Various other peripherals may also be included to provide additional functions, e.g., radio and television reception.

Figure 6:
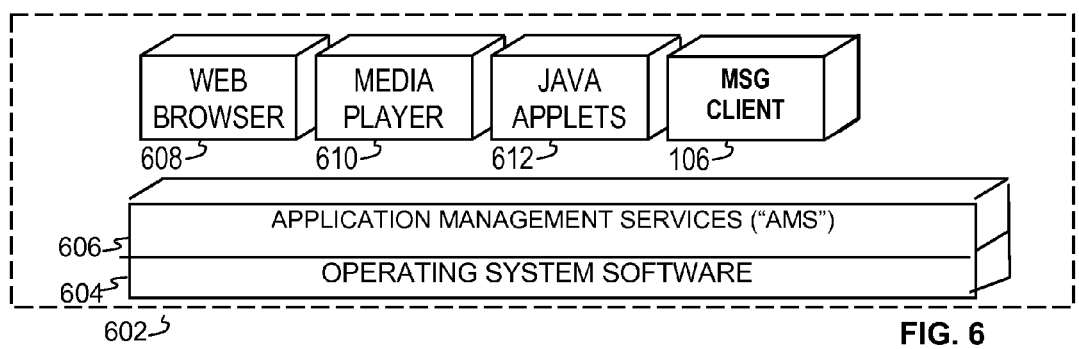
FIG. 6 is a block diagram of a software architecture of a handset according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the handset 400. Also shown in FIG. 6 are a web browser application 608, a media player application 610, and JAVA applets 612. The web browser application 608 configures the handset 400 to operate as a web browser, allowing a user to enter information into forms and select links to retrieve and view web pages. The media player application 610 configures the handset 400 to retrieve and play audio or audiovisual media. The JAVA applets 612 configure the handset 400 to provide games, utilities, and other functionality. The messaging client 106 has already been discussed above with reference to FIG. 1.

Figure 7:
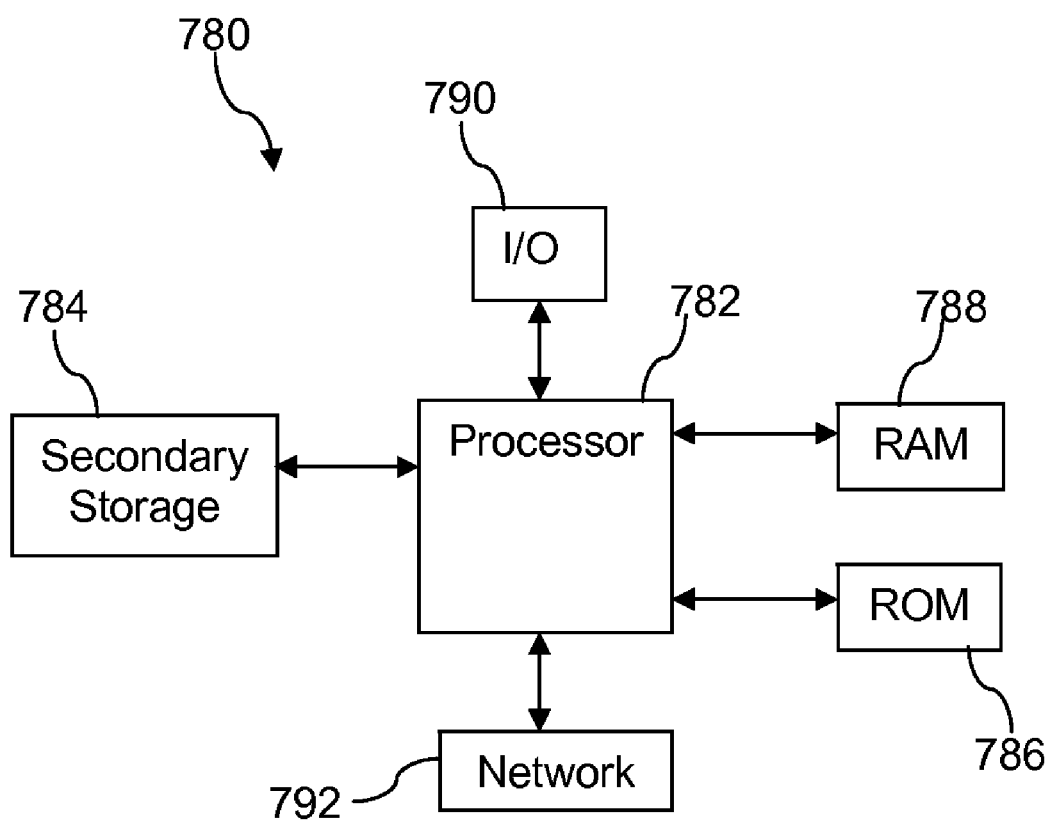
FIG. 7 illustrates an exemplary computer system suitable for implementing aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as non-transitory storage or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard disks, floppy disks, optical disks, or other devices, the ROM 786, and/or the RAM 788 may be referred to in some contexts as non-transitory instructions or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A portable electronic device, comprising:
   a wireless transceiver to receive and transmit messages; and
   a first messaging client that receives a first message from the wireless transceiver, wherein the first message is from a second messaging client, wherein the first message comprises a first message sequence count, and wherein the first message sequence count comprises a count of short message service (SMS) messages exchanged between the first messaging client and the second messaging client,
   parses the first message to read the first message sequence count,
   compares the first message sequence count to a first expected message sequence count maintained by the portable electronic device, and
   transmits a corrective message to the wireless transceiver for transmitting to the second messaging client based on a miscompare of the first message sequence count with the first expected message sequence count.

2. The portable electronic device of claim 1, wherein the first message and the corrective message are short message service (SMS) messages.

3. The portable electronic device of claim 1, wherein the first message sequence count is incremented by the first messaging client when sending a new message to the second messaging client and when receiving a new message from the second messaging client.

4. The portable electronic device of claim 1, wherein the first message sequence count is associated with messages transmitted by the second messaging client and received by the first messaging client and wherein the first messaging client maintains a second message sequence count that is associated with messages transmitted by the first messaging client and received by the second messaging client.

5. The system of claim 4, wherein the second messaging client maintains a third message sequence count that is associated with messages received by the second messaging client from the first messaging client.

6. The system of claim 5, wherein the second messaging client maintains a fourth message sequence count that is associated with messages received by the first messaging client from the second messaging client.

7. The portable electronic device of claim 1, wherein the first messaging client further determines a cyclic redundancy check (CRC) value associated with a content and transmits a message comprising the content and the cyclic redundancy check value to the wireless transmitter for transmitting to the second messaging client.

8. The portable electronic device of claim 1, wherein the first messaging client further transmits a message comprising a content and a current time value to the wireless transmitter for transmitting to the second messaging client.

9. The portable electronic device of claim 1, wherein the first messaging client deletes stored messages received from the second messaging client that are at least one of older than a predefined age threshold and exceed a maximum count of stored messages.

10. A method of communicating, comprising:
    receiving, by a portable electronic device, a first message containing a first message sequence count value;
    parsing, by the portable electronic device, the first message to read the first message sequence count value, wherein the first message sequence count value comprises a count of short message service (SMS) messages exchanged between the portable electronic device and a first peer electronic device;
    comparing, by the portable electronic device, the first message sequence count value to a first expected count value maintained by the portable electronic device and associated with communication between the portable electronic device and the first peer electronic device;
    determining, by the portable electronic device, based on the comparison of the first message sequence count value to the first expected count value, that the portable electronic device has failed to receive an at least one message from the first peer electronic device; and
    transmitting, by the portable electronic device, a second message to the first peer electronic device requesting that the first peer electronic device retransmit the at least one message that the portable electronic device failed to receive.

11. The method of claim 10, further comprising presenting a message on a display of the portable electronic device that a subscriber account associated with the portable electronic device will be billed for having the at least one message retransmitted to the portable electronic device.

12. The method of claim 10, further comprising:
    receiving, by the portable electronic device, a third message containing a second message sequence count value;
    parsing, by the portable electronic device, the third message to read the second message sequence count value;
    comparing, by the portable electronic device, the second message sequence count value to a second expected count value maintained by the portable electronic device and associated with communication between the portable electronic device and the first peer electronic device;
    determining, by the portable electronic device, based on the comparison of the second message sequence count value to the second expected count value, that the portable electronic device has failed to receive a plurality of messages from the first peer electronic device; and
    presenting a message on a display of the portable electronic device indicating that the plurality of messages is too large to be recovered.

13. The method of claim 10, further comprising:
    determining, by the portable electronic device, a network transport time for messages;
    receiving, by the portable electronic device, a fourth message containing a third message sequence count value;
    parsing, by the portable electronic device, the fourth message to read the third message sequence count value;
    comparing, by the portable electronic device, the third message sequence count value to a third expected count value maintained by the portable electronic device and associated with communication between the portable electronic device and the first peer electronic device;
    determining, by the portable electronic device, based on the comparison of the third message sequence count value to the third expected count value, that the portable electronic device has failed to receive a message from the first peer electronic device; and
    after waiting more than the network transport time, transmitting, by the portable electronic device, a fifth message to the first peer electronic device requesting that the first peer electronic device retransmit the message that the portable electronic device failed to receive.

14. The method of claim 10, further comprising:
    receiving, by the portable electronic device, a sixth message containing a fourth message sequence count value;

parsing, by the portable electronic device, the sixth message to read the fourth message sequence count value;

comparing, by the portable electronic device, the fourth message sequence count value to a fourth expected count value maintained by the portable electronic device and associated with communication between the portable electronic device and a second peer electronic device;

determining, by the portable electronic device, based on the comparison of the fourth message sequence count value to the fourth expected count value, that the portable electronic device has failed to receive a message from the second peer electronic device; and transmitting, by the portable electronic device, a seventh message to the second peer electronic device requesting that the second peer electronic device retransmit the message that the portable electronic device failed to receive.

15. The method of claim 10, further comprising deleting a plurality of messages received from the first peer portable electronic device and stored by the portable electronic device that are older than a first predefined threshold.

16. The method of claim 15, further comprising deleting a plurality of messages received from a second peer portable electronic device and stored by the portable electronic device that are older than a second predefined threshold, wherein the first predefined threshold is different from the second predefined threshold.

17. The method of claim 10, further comprising:
determining a period of time since the portable electronic device last received a message from a third peer electronic device; and
when the period of time exceeds a third predefined threshold, sending a check-up message to the third peer electronic device.

* * * * *